(12) United States Patent
Barber

(10) Patent No.: US 6,315,698 B1
(45) Date of Patent: Nov. 13, 2001

(54) GUITAR PLAYER'S FINGER EXERCISER AND METHOD

(76) Inventor: Gregg Barber, 100 Hill St., Bay City, MI (US) 48708

( * ) Notice: Subject to any disclaimer, the term of this patent is extended or adjusted under 35 U.S.C. 154(b) by 0 days.

(21) Appl. No.: 09/688,524

(22) Filed: Oct. 16, 2000

(51) Int. Cl.[7] ............................. A63B 23/16; G10D 3/16
(52) U.S. Cl. ................................ 482/93; 482/44
(58) Field of Search ............. D17/20, 22; 84/322, 84/329; 482/92, 93, 44, 105, 106–109, 45, 50, 51

(56) References Cited

U.S. PATENT DOCUMENTS

| | | |
|---|---|---|
| 19,814 | 3/1858 | Monestier . |
| 251,206 | 12/1881 | Forbush . |
| D. 325,411 | 4/1992 | Everly . |
| D. 385,293 | 10/1997 | Sarno . |
| D. 403,012 | 12/1998 | Anderko . |
| D. 439,602 * | 3/2001 | Morris ................................. D17/20 |
| 655,959 | 8/1900 | Cochrane . |
| 3,442,169 * | 5/1969 | Bowers ................................. 84/322 |
| 3,533,185 | 10/1970 | Kanbar . |
| 4,248,128 | 2/1981 | Des Gaines . |
| 5,092,588 | 3/1992 | DeLuca . |
| 5,125,878 | 6/1992 | Wingate et al. . |
| 5,488,892 | 2/1996 | Jepsen . |
| 5,610,349 | 3/1997 | Fogarty et al. . |
| 5,756,914 | 5/1998 | Streibl . |
| 5,796,021 * | 8/1998 | Longshore ............................. 84/329 |
| 5,856,627 * | 1/1999 | George ................................. 84/322 |
| 5,935,045 | 8/1999 | Lowe . |

* cited by examiner

*Primary Examiner*—Stephen R. Crow
(74) *Attorney, Agent, or Firm*—Reising, Ethington, Barnes, Kisselle, Learman & McCulloch, P.C.

(57) ABSTRACT

The guitar player's finger exerciser includes a weight member and a guitar pick. The weight member has a pick receiving slot. A string contact portion of the guitar pick is received in the pick receiving slot. The finger grasping surfaces of the guitar pick extend out of the pick receiving slot. A retainer holds the string engaging portion of the guitar pick in the pick receiving slot. The guitar pick is held by a person exercising his fingers, hand and arm the same way it would be held when playing a guitar. While exercising the pick and attached weight is moved at a similar speed and in a path similar to the speed and path employed when playing music.

8 Claims, 1 Drawing Sheet

GUITAR PLAYER'S FINGER EXERCISER AND METHOD

FIELD OF THE INVENTION

The guitar player's finger exerciser for exercising the fingers that hold a guitar pick includes a pick with an attached weight encased in a plastic, that is held by a person's fingers and moved in a path similar to the path of movement employed when playing a guitar.

BACKGROUND OF THE INVENTION

Musicians practice and improve their skills by playing their instruments. Many of these instruments require hand and digit dexterity and strength. Musicians discovered many years ago that hand and digit exercises, in addition to playing their instruments, can improve their playing skills. They also learned that there are times when they cannot practice by playing their instruments because the sounds produced by the instruments disturb others "or because they are away from their instruments."

Piano and organ players attached weights to their fingers and wrists to improve strength and attain greater freedom of motion more than a century and a half ago. The benefits of such exercises were recognized at that time even though many people regularly exercised their finger, hand and arm muscles during normal daily chores such as milking cows and food preparation.

Finger fitness devices are known for the fretting hand of guitar players. These fitness devices include exercising with a spring resistance that is overcome by a finger. There are also guitar fitness fingerboards for guitarists. When exercising with these fingerboards, the guitarists depresses strings into contact with frets. The tension on the strings is adjustable. The height of each fret is also adjustable.

Finger fitness devices for pick the holding hand that are currently in use are general exercise devices designed for rehabilitation or for grip strength improvement. These devices are useful but do not address pick hand dexterity improvements for guitar players.

SUMMARY OF THE INVENTION

The guitar player's finger exerciser employs a guitar pick having a finger grasping portion and a string engaging portion. A weight member has a pick receiving slot that receives the string engaging portion of the guitar pick. A retainer retains the string engaging portion of the guitar pick in the pick receiving slot.

During use of the finger exerciser, the guitar pick is held the same way it would be held during use. Movement of the finger exerciser is at the speed and follows substantially the same path of movement that would be used when strumming or picking a stringed instrument.

BRIEF DESCRIPTION OF THE DRAWINGS

The presently preferred embodiment of the invention is disclosed in the following description and in the accompanying drawings, wherein.

DETAILED DESCRIPTION OF THE PREFERRED EMBODIMENT

Figure 1:
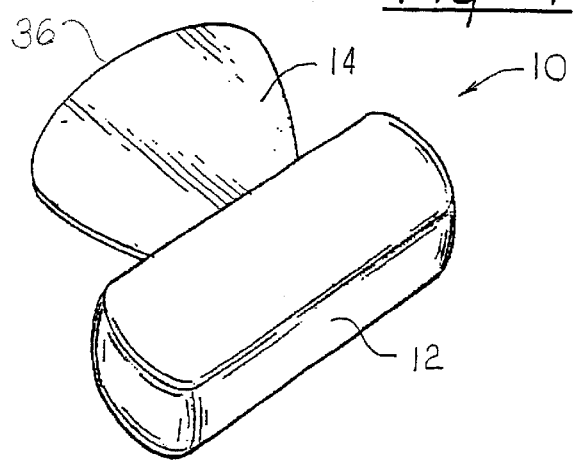
FIG. 1 is a perspective view of the guitar player's finger exerciser.
Figure 2:
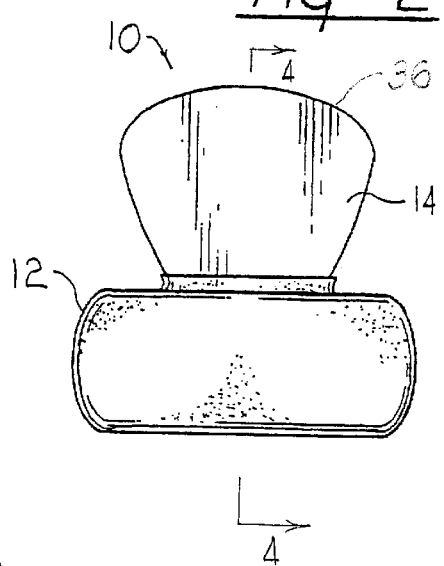
FIG. 2 is a plan view of the guitar player's finger exerciser.
Figure 3:
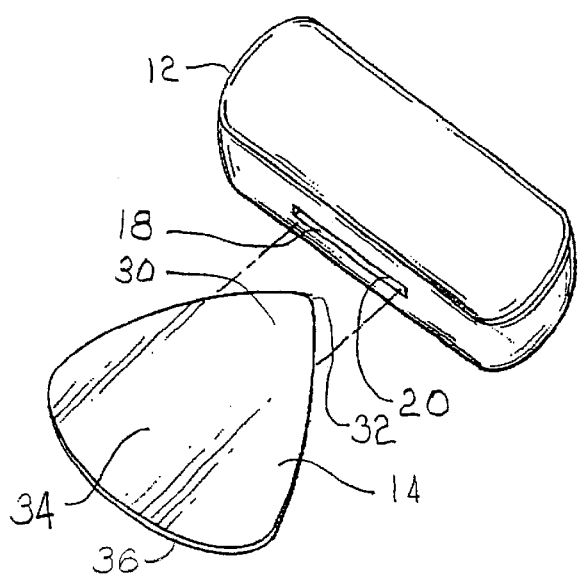
FIG. 3 is an expanded view of the guitar player's finger exerciser.
Figure 4:
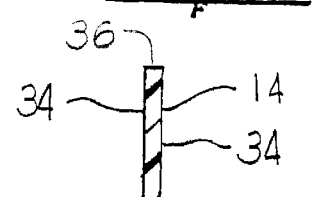
FIG. 4 is an enlarged sectional view taken along line 4—4 in FIG. 2.
Figure 5:
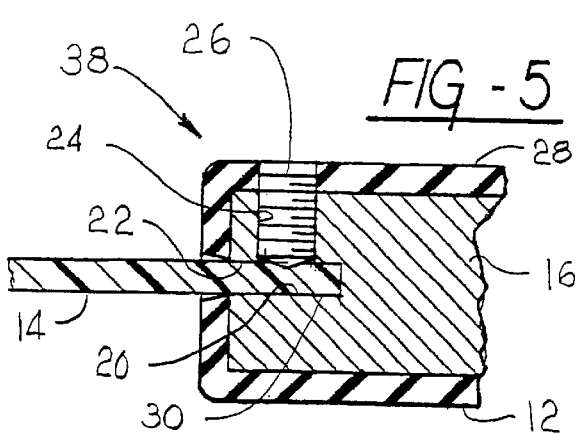
FIG. 5 is an enlarged sectional view, with parts broken away, showing a retainer that retains the weight member on the guitar pick.

The guitar player's finger exerciser 10 has a weight member 12 and a guitar pick 14. The weight member 12 is a metal block 16 with a guitar pick slot 18. The size and weight of the metal block 16 can vary. However four or five ounces is the preferred weight. The guitar pick slot 18 has a first side wall 20 and a second side wall 22. The distance between the first and second side walls 20 and 22 is slightly more than the thickness of the thickest guitar pick 14 that is normally employed by guitar players.

A threaded bore 24 extends into one side of the weight member 12 and into the guitar pick slot 18. A set screw 26 screws into the threaded bore 24. The purpose of the set screw 26 will be explained below.

The weight member is preferably a metal such as steel or stainless steel. If stainless steel is used, an outside coating is not required to prevent rust. Copper could also be used if desired. The metal block 16 as shown is encased in a polymer casing 28. The casing reduces noise if the finger exerciser 10 is dropped or hit and prevents corrosion. The casing 28 also provides some cushioning if the finger exerciser is carried in a person's pocket.

The guitar pick 14 has guitar string contact surfaces 30 adjacent to a point 32 and finger grasping surfaces 34 adjacent to a holding edge 36. These picks 14 are available with varying stiffness. Some guitar players use guitar picks 14 that are substantially rigid. Other guitar players use guitar picks 14 that flex with minimal force. The finger grasping surfaces 34 can be flat and smooth as shown or they can be contoured to make them easier to hold. A retainer system 38, for holding the guitar pick 14 in the guitar pick slot 18, that permits removal of the guitar pick also permits a person using the finger exerciser to use a guitar pick of his choosing.

The portion of a guitar pick 14 with the guitar string contact surfaces 30 and the point 32 is inserted into the guitar pick slot 18 in the weight member 12. The set screw 26 is tightened to anchor the guitar pick 14 in the guitar pick slot 18. An adhesive could be used to hold the guitar pick 14 in the pick slot 18 in place of the set screw 26 if desired. An adhesive would make it difficult to change guitar picks 14. Another anchor system that could be used is a wedge that is forced into one side of a wider guitar pick slot 18 by a threaded fastener. A wedge would fix the pick 14 in the pick slot 18. However a wedge would most likely be more expensive.

During use of the guitar player's finger exerciser 10, a person grasps the guitar pick 14 by the finger grasping surfaces 34 on both sides of the pick in the same manner that the pick would be held when playing a guitar. The person would then move the finger exerciser 10 along a path similar to the path of movement of a pick when a guitar is being played. The speed of movement of the exerciser 10 should also be about the same as the speed of pick movement when playing a guitar.

The finger exerciser can be used when watching television, talking on the telephone or even when reading the newspaper. It improves finger, hand and arm strength and dexterity. Improved dexterity will most likely improve the music played by the person that has used the finger exerciser 10 for a period of time.

Obviously, many modifications and variation of the present invention are possible in light of the above teachings. It is, therefore, to be understood that within the scope of the appended claims, the invention may be practiced otherwise than as specifically described. The invention is defined in the claims.

What is claimed is:

1. A guitar player's finger exerciser comprising:

a guitar pick having a finger grasping portion and a string engaging portion;

a weight member having a pick receiving slot which receives the string engaging portion of said guitar pick; and a retainer that retains the string engaging portion of said guitar pick in the pick receiving slot.

2. A guitar player's finger exerciser as set forth in claim 1 wherein the retainer is an adhesive.

3. A guitar player's finger exerciser as set forth in claim 1 wherein the retainer is a clamp that compress the string engaging portion of said guitar pick against a side wall of the pick receiving slot.

4. A guitar player's finger exerciser as set forth in claim 1 wherein the retainer includes a set screw in a threaded bore in the weight member that engages the string engaging portion of said guitar pick and holds the string engaging portion against a side wall of the pick receiving slot.

5. A guitar player's finger exerciser as set forth in claim 1 wherein the weight member is a metal member encased in a plastic material.

6. A guitar player's finger exerciser comprising:

a weight member having a pick receiving slot and a threaded bore that intersects the pick receiving slot;

a guitar pick having a string engaging portion extending into the pick receiving slot and a finger grasping portion extending out of the pick receiving slot; and a set screw screwed into the threaded bore, engaging the string engaging portion and holding the string engaging portion of the guitar pick in the pick receiving slot.

7. A guitar player's finger exerciser as set forth in claim 6 wherein the weight member is a metal member encased in a polymer.

8. A guitar player's finger exercising method comprising:

inserting a string contact portion of a guitar pick into a pick receiving slot in a weight member;

anchoring the guitar pick in the pick receiving slot;

grasping a finger grasping portion of the guitar pick; and moving the guitar pick and the weight member attached to the guitar pick in a path that is similar to the path followed by the guitar pick when playing music.

* * * * *